United States Patent [11] 3,620,821

[72] Inventor Gordon C. Johnson
 Katonah, N.Y.
[21] Appl. No. 760,735
[22] Filed Sept. 18, 1968
[45] Patented Nov. 16, 1971
[73] Assignee Union Carbide Corporation
 New York, N.Y.

[54] TREATMENT OF FIBERS WITH SILOXANE-POLYOXYALKYLENE BLOCK COPOLYMERS CONTAINING METHOXYSILOXY GROUPS
13 Claims, No Drawings

[52] U.S. Cl....................................................... 117/126 GS,
 117/161 ZA, 260/824, 117/138.8 D,
 117/138.8 N, 117/138.8 E, 117/138.8 F,
 117/138.8 UA, 117/143 A, 117/141, 117/139.4
[51] Int. Cl.......................................................C03c 25/02,
 C08g 47/10
[50] Field of Search............................................ 117/126
 GS, 161 ZA, 138.8 D, 143 A, 139.4, 141, 138.8 N,
 138.8 E, 138.8 F, 138.8 UA; 260/824

[56] References Cited
UNITED STATES PATENTS
3,140,198 7/1964 Dawson........................ 117/161 X
FOREIGN PATENTS
1,123,447 8/1968 Great Britain
603,552 11/1966 Belgium Primary Examiner—William D. Martin
Assistant Examiner—D. Cohen
Attorneys—Paul A. Rose, Aldo John Cozzi, George A. Skoler, Reynold J. Finnegan and Eugene C. Trautlein ABSTRACT: This invention relates to a process for treating fibrous materials (e.g., synthetic or natural organic textile fibers or fibrous glass) with siloxane-polyoxyalkylene block copolymers containing methoxysiloxy groups in order to improve the properties (e.g., soil release) of the fibrous materials.

TREATMENT OF FIBERS WITH SILOXANE-POLYOXYALKYLENE BLOCK COPOLYMERS CONTAINING METHOXYSILOXY GROUPS

The treatment of fibrous materials with organosilicon compounds in order to improve the properties of the fibrous materials is well known in the art. By way of illustration, it has been proposed that siloxane-polyoxyalkylene block copolymers can be applied to fibrous glass and organic textiles in order to enhance such properties as lubricity and resistance to the accumulation of static electricity.

Methods of treating fibrous materials with siloxane-polyoxyalkylene block copolymers proposed to date have suffered from certain drawbacks attributable to the nature of the particular siloxane-polyoxyalkylene block copolymer employed. Thus, in certain of these block copolymers, the siloxane block is linked to the polyoxyalkylene by a silicon to oxygen bond which is subject to hydrolysis in the aqueous baths often used in applying the block copolymers to fibrous materials. Such block copolymers are also prone to hydrolysis when fibrous materials coated therewith are exposed to water, especially under non-neutral conditions (e.g., when the fibrous material is washed with an alkaline detergent solution). Further, most siloxane-polyoxyalkylene block copolymers proposed for treatment of fibrous materials are free of reactive sites and such block copolymers have been found to produce coatings on fibrous materials lacking in durability. That is, the coatings are removed when the fibrous materials are subjected to repeated washings.

It has been disclosed that siloxane-polyoxyalkylene block copolymers having SiH groups gave good durability to washing when coated on fibrous materials. Apparently, the SiH groups are reactive and provide sites for bonding the block copolymers to the fibrous materials or for cross-linking the block copolymers to encapsulate the fibers of the fibrous materials. Although durable coatings can be produced on fibrous materials with such block copolymers, the block copolymers are not entirely satisfactory in fiber treating applications as the SiH groups therein impart limited storage stability to aqueous fiber treating baths containing the block copolymers. Further, when significant amounts of polyoxypropylene groups or higher polyoxyalkylene groups are present in such block copolymers, or in other known fiber-treating siloxane-polyoxyalkylene block copolymers, the block copolymers are not as soluble in water as may be desired and also impart poor soil release characteristics to fibrous materials coated therewith.

It is an object of this invention to provide an improved process for treating fibrous materials with certain siloxane-polyoxyalkylene block copolymers.

It is another object of this invention to provide a process for producing durable coatings of siloxane-polyoxyalkylene block copolymers on fibrous materials.

It is a further object of this invention to provide a process for treating fibrous materials with relatively storage stable aqueous solutions of siloxane-polyoxyalkylene block copolymers.

It is a still further object of this invention to impart soil release properties to fibrous materials by treatment thereof with siloxane-polyoxyalkylene block copolymers.

Other objects of this invention will be apparent from the following description thereof.

This invention provides a novel process which comprises (A) applying to a fibrous material a minor amount of siloxane-polyoxyalkylene block copolymer containing groups represented by the formula:

wherein $a$ has a value of 1, 2 or 3, and each R is a monovalent hydrocarbon group, a methoxy group or a divalent organic group that links the silicon atom in formula (1) to a polyoxyalkylene chain and that is bonded to the silicon atom in formula (1) by a carbon to silicon bond; provided that the copolymer contains an average of at least 0.05 such methoxy group per silicon atom; that the copolymer contains at least one such divalent organic group and at least one such methoxy group per molecule; that at least 75 mol percent of the oxyalkylene groups in the polyoxyalkylene chains are oxyethylene groups; and that the copolymer is substantially free of silicon-bonded hydrogen atoms; and (B) curing the copolymer on the fibrous material.

Preferably, the polyoxyalkylene chain or chains constitute from 30 to 85 weight percent of the block copolymer and the copolymer contains an average of less than 0.02 silicon-bonded hydrogen atom per silicon atom in the copolymer. More desirably, the copolymer contains an average of less than 0.01 silicon-bonded hydrogen atom per silicon atom in the copolymer. Preferably, the block copolymer contains silicon-bonded methoxy groups and silicon atoms in a ratio of from 2:10 to 8:10 inclusive and from 90 to 100 mol percent of the oxyalkylene groups in the polyoxyalkylene chain are oxyethylene groups. Preferably the molecular weight of the block copolymer is from 5,000 to 20,000. The block copolymers are preferably soluble in water (e.g., at least to the extent of 1 part by weight of the copolymer per 100 parts by weight of water).

Typical of the monovalent hydrocarbon groups represented by R in formula (1) above are the alkyl groups (e.g., the methyl, ethyl, propyl, butyl and pentyl groups), the aryl groups (e.g., the phenyl, and naphthyl groups), the aralkyl groups (e.g., the benzyl and beta-phenyl ethyl groups), the linear alkenyl groups (e.g., the vinyl, alkyl and butenyl groups) and the cycloalkenyl groups (e.g., the cyclopentenyl and cyclohexyl groups). Preferably the monovalent hydrocarbon group represented by R is a methyl group.

The structure of the divalent organic group represented by R in formula (1) is usually governed by the type of reaction involved in producing the siloxane-polyoxyalkylene block copolymer. Such copolymers can be produced by any number of known reactions thereby giving rise to a variety of divalent organic groups linking the siloxane portion to the oxyalkylene portion of the copolymer. Typical of such known reactions are the following:

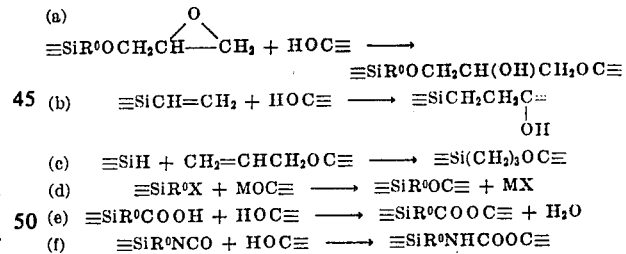

In the above equations (a) to (f), X represents a halogen atom (i.e., bromine, chlorine, fluorine, or iodine), M is an alkali metal such as sodium or potassium, and R° is a divalent hydrocarbon radical. In the equations (a) through (f) the Si-containing group on the far left represents the reactive portion of the siloxane reactant while the group immediately to the left of the arrow represents reactive portion of the polyoxyalkylene reactant.

Illustrative of the divalent organic groups represented by R in formula (1) and R° in formulas (a) to (f) are the alkylene groups (such as the methylene, ethylene, propylene, butylene, 2,2-dimethyl-1,3-propylene and decylene groups), the arylene groups (such as the phenylene and p,p'-diphenylene groups), and the aralkylene groups (such as the phenylethylene group). Preferably, the divalent organic group is an alkylene group containing from two to four successive carbon atoms.

Siloxane groups represented by formula (1) containing divalent organic groups as substituents are illustrated by groups having the formulas:

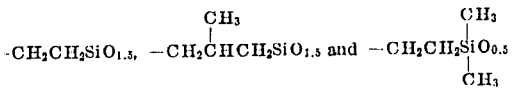

These organic hydrocarbon groups are linked to a silicon atom of the siloxane chain or block of the copolymer by a silicon-to-carbon bond and to an oxygen atom of the oxyalkylene chain of the copolymer by a carbon-to-oxygen bond.

The block copolymers useful in this invention can contain siloxane groups represented by formula (1) wherein either the same groups are attached to the silicon atoms (e.g., the dimethylsiloxy, diphenylsiloxy and diethylsiloxy groups) or different hydrocarbon groups are attached to the silicon atom (e.g., the methylphenylsiloxy, phenylethylmethylsiloxy and ethylvinylsiloxy groups). These copolymers can contain one or more types of siloxane groups that are represented by formula (1) provided that at least one group has at least one divalent organic substituent and at least one group has at least one methoxy substituent. By way of illustration, only ethylenemethyloxysiloxy groups,

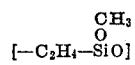

can be present in the siloxane block or the copolymer can contain more than one type of siloxane group, e.g., the copolymer can contain both ethylenemethyloxysiloxy groups and diphenylsiloxy groups, or the copolymer can contain ethylenmethyloxysiloxy groups, diphenylsiloxy groups and the diethylsiloxy groups. The copolymers useful in this invention can contain trifunctional siloxane groups (e.g., monomethylsiloxane groups, $CH_3SiO_{1.5}$), difunctional siloxane groups (e.g., dimethylsiloxane groups, $(CH_3)_2SiO-$), monofunctional siloxane groups (e.g., trimethylsiloxane groups, $(CH_3)_3SiO_{0.5}$), or combination of these types of siloxane groups having the same or different substituents. Due to the functionality of the siloxane groups, the copolymer can be predominantly linear or cyclic or cross-linked or it can have combinations of these structures.

The siloxane portion of the block copolymers useful in this invention can contain end-blocking or chain terminating organic groups other than the chain terminating groups encompassed by formula (1). By way of illustration, the siloxane portion can contain such silicon-bonded end-blocking groups as the hydroxyl group, the aryloxy groups (such as the phenoxy group), the alkoxy groups (such as the ethoxy, propoxy and butoxy groups), the acyloxy groups (such as the acetoxy group), and the like.

Typical of the polyoxyalkylene chains linked to the silicon atom in formula (1) by the divalent organic group represented by R are those having the formula:

$$(-OC_nH_{2n}-)_x \quad (2)$$

wherein n has a value of at least 2 and x has a value of at least 5, provided at least 75 mol percent of the $-OC_nH_{2n}-$ groups are $-OC_2H_4-$ groups. Chains represented by formula (2) include homopolymeric chains containing only oxyethylene groups and copolymeric chains containing both oxyethylene groups and other oxyalkylene groups (e.g., 1,2-oxypropylene, 1,2-oxybutylene, and the like).

The polyoxyalkylene chains in the block copolymers useful in the process of this invention can be endblocked in any of a variety of ways. By way of illustration, the polyoxyalkylene chains can be endblocked with another divalent organic group represented by R, a hydroxyl group, a hydrocarbonoxy group (-OR), an acyloxy group, a trihydrocarbylsiloxane group, etc.

Preferred block copolymers for use in the process of this invention are composed of the following groups:

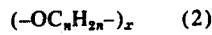

$$CH_3OSiO_{\frac{3-c}{2}}^{R'''_c} \quad (4)$$

and $$R'''_dSiO_{\frac{4-d}{2}} \quad (5)$$

wherein R' is a hydrogen or R''', R''' is a monovalent hydrocarbon group as defined for R in formula (1) above, R'' is an alkylene group containing at least two carbon atoms, n and x have the above defined meanings, b and c have values of 0, 1 or 2 and d has a value of 1, 2 or 3.

Especially preferred block copolymers, for use in the process of this invention are those represented by the average formula:

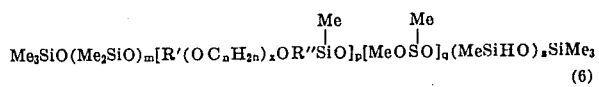

wherein Me is a methyl group, m has a value from 0 to 100, (p+q) has a value from 10 to 100 inclusive, p is a positive number having a value for 0.15(p+q) to 0.8(p+q), q is a positive number, z has has a value less than 0.01 and R', R'', n and x have the above-defined meanings.

Of course, the block copolymers represented by formula (6) above and the block copolymers composed of groups represented by formulas (3), (4), and (5) above have the critical minimum methoxy to silicon ratio, minimum oxyethylene content and maximum silanic hydrogen content set out in connection with formula (1) above.

The siloxane-oxyalkylene block copolymers useful in the process of this invention are readily prepared by sequentially reacting a siloxane with a precursor for the polyoxyalkylene chain and a precursor for the methoxy groups in accordance with any of the well known processes for attaching polyoxyalkylene chains and methoxy groups to silicon atoms. For example, a siloxane containing SiH groups can be reacted with a stoichiometric insufficiency of an alkenyl endblocked polyoxyalkylene polymer in the presence of a platinum catalyst to produce a siloxane-polyoxyalkylene block copolymer containing SiH groups. The copolymer so produced can be then reacted with methanol to convert the remaining SiH groups to Si-methoxy groups so as to produce a block copolymer useful in the process of this invention. Chloroplatinic acid in an amount that provides from 0.003 to 0.008 parts by weight of platinum per 100 parts by weight of the reactants is a suitable catalyst for both of the foregoing reactions.

Reference is also made to the various other well-known methods for attaching polyoxyalkylene chains and methoxy groups to siloxanes. Such methods are generally applicable to the production of the block copolymers useful in this invention.

The block copolymers useful in the process of this invention can obviously be modified in a variety of known ways to modify the structure thereof. By way of illustration, siloxane groups other than those disclosed above (e.g., halohydrocarbylsiloxane groups) and be incorporated into the block copolymers or into the siloxane reactants from which they are produced by known methods (e.g., by equilibration).

The block copolymers employed in the process of this invention can be discrete chemical compounds. Usually, however, the block copolymers are mixtures of various discrete block copolymeric species. The block copolymers are usually mixtures due, at least in part, to the fact that the siloxane and poly-oxyalkylene reactants used to produce the block copolymers are themselves usually mixtures.

The siloxane-polyoxyalkylene block copolymers employed in the process of this invention are disclosed and claimed as novel compositions of matter in copending application Ser. No. 760,720 entitled "Siloxane-Polyoxyalkylene Block Copolymers Containing Methoxysiloxy Groups," filed concurrently herewith in the name of Gordon C. Johnson.

Any of a wide variety of fibrous materials can be treated with the above-described siloxane-polyoxyalkylene copolymers in accordance with the process of this invention. Included among such fibrous materials are fibrous glass and organic fibers such as vinyl halide, vinylidene halide, polyamide, acrylic, polyester, polyurethane, polyolefin and cellulosic fibers. The fibrous material can be in any of a variety of forms (e.g., single filaments, rovings, yarns, mats or cloth). Blends of two or more types of fibers can be treated. Typical of the polyester fibrous materials are those linear polyesters produced from such dicarboxylic acids as phthalic acid, terephthalic acid, and isophthalic acid and such diols as ethylene glycol, and tetramethylene glycol. Typical of such organic fibrous materials are Dacron, Terylene, nylon, Orlon, Acrylan, Creslan, Dynel, Darlon, Verel, Zefran, Velon, Vinyon, polyethylene and polypropylene as well as silk, wool, cotton, rayon and linen.

Fibrous materials can be treated with the above-described block copolymers in accordance with the process of this invention in any of a variety of ways. Thus, the fibrous material can be immersed in a solution containing the block copolymer. Then excess solution can be removed from the fibrous material (e.g., by padding). Other methods of treatment include brushing or spraying a solution or dispersion of the copolymer on the fibrous material, again followed by padding. Still other methods of treatment involve thickening a bath containing the block copolymer and knife-coating and thickened bath on the fibrous material.

The block copolymer is cured on the fibrous material in accordance with this invention by any suitable means. Preferably, curing of the block copolymer is accomplished by heating the treated fibrous material at a temperature from 120° C. to 175° C. If desired, a curing catalyst for the block copolymer can be applied to the fibrous material before curing the copolymer (preferably as a component of the treating solution or dispersion containing the block copolymer). Preferred catalysts include acid salts such as $MgCl_2$, $ZnNo_3$ and $ZnCl_2$. In general, any known catalyst for the hydrolysis of SiOMe groups can be used (e.g., weakly basic or weakly acidic materials such as trifluoracetic acid, $NaCo_3$, sodium trifluoroacetate, etc.).

Apparently, the cure of the siloxane-polyoxyalkylene block copolymers used in this invention occurs by the reaction of the silicon-bonded methoxy groups therein. Without wishing to be bound by any theory, it appears that the silicon-bonded methoxy groups react with water in the treating bath or on the surface of the fibers to form silanol groups (SiOH) which condense with one another to form siloxane linkages (Si–O–Si). As a result, the individual fibers are at least partly encapsulated by the cured copolymer. Of course, it is also possible that such silanol groups condense with reactive groups on the surface of the fiber.

Suitable treating solutions or dispersions (baths) can contain a diluent and from 0.1 to 10.0 parts by weight per 100 parts by weight of the diluent of a siloxane-polyoxyalkylene block copolymer as defined above. Suitable diluents include water, aqueous solvents, alcohols, glycols, glycol ethers, hydrocarbons, halohydrocarbons and ketones. Specific diluents include aqueous methanol, ethylene glycol, diethylene glycol toluene, carbon tetrachloride and acetone.

In the process of the invention, the amount of the block copolymer coated on the fibrous material (the "add-on") can vary widely depending on such factors as the desired properties of the final product, economic considerations, compatibility factors, etc. Generally, it is desired the fibrous material be coated with from 0.5 to 6 parts by weight of the copolymer per 100 parts by weight of the fibrous material. Preferably the fibrous material is coated with from 2 to 4 parts by weight of the copolymer per 100 parts by weight of the fibrous material.

A preferred embodiment of the process of this invention involves treating a hydrophobic fibrous textile material with a copolymer as above defined. Such hydrophobic materials include those in which the fibers are formed from hydrophobic polymers (e.g., polyesters) and textile materials in which the fibers have been coated with a hydrophobic substance (e.g., certain creaseproofing agents). The soil release of such textiles is remarkably increased by such treatment.

In the above-described preferred embodiment of the process of this invention, it is often desirable to treat the textile material containing hydrophobic fibers (e.g., textiles composed of polyester fibers alone or blended with hydrophilic fibers such as cellulosic fibers) with a creaseproofing agent as well as the block copolymer to impart permanent press properties as well as soil release properties, to the fibrous material. Such creaseproofing agents (also called durable press agents and textile resins) are well known materials and include aminoplast resins, epoxides, aldehydes, aldehyde derivatives, sulfones and sulfoxides. Aminoplast resins are preferred creaseproofing agents as they are relatively inexpensive while sulfoxides are not preferred as they require basic catalysts which may cause undesirable reactions involving the siloxane-polyoxyalkylene copolymer. Suitable creaseproofing agents are disclosed in "Creaseproofing Agents For Wash-and-Wear Finishing" by A. C. Nuessle, Textile Industries, Oct. 1959, pages 1 to 12.

Typical aminoplast creaseproofing agents included the urea-formaldehyde condensates, e.g., methylolated ureas and alkyl ureas, etc.; melamine-formaldehyde condensates, e.g., tri, tetra and penta menthylol and methoxymethyl melamines, etc.; alkylene ureas, e.g., dimethylol ethylene or propylene urea, dihydroxydimethylol ethylene urea and various alkoxymethyl derivatives thereof, etc.; carbamates, e.g., dimethylol alkyl and alkoxyalkyl carbamates, etc.; formaldehyde-acrolein condensation products; formaldehyde-acetone condensation products; alkylol amides, e.g., methylol formamide, methylol acetamide, etc.; alkylol acrylamides, e.g., N-methylol methacrylamide, N-methylol-N-methylacrylamide, N-methylol methylene-bis (acrylamides), methylene bis (N-methylol acrylamide), etc.; diureas, e.g., trimethylol and tetramethylol acetylene diureas, etc.; triazones, e.g. dimethylol N-ethyltriazone, N,N'-ethylene-bis(di-methylol triazone), etc., urons, e.g., dialkoxymethyl uron, etc., and the like.

Typical epoxide creaseproofing agents include the diglycidyl ethers of polyols such as ethylene glycol diglycidyl either and diepoxides such as vinyl cyclohexene dioxide. Typical aldehyde creaseproofing agents include formaldehyde, glyoxal and alpha-hydroxydipaldehyde. Typical aldehyde derivative creaseproofing agents include 2,4,6-trimethylol phenol, tetramethylol acetone, diethylene glycol acetal and pentaerytheritol bis acetal. Typical sulfone creaseproofing agents include $NaO_3SSCH_2CH_2SO_2CH_2CH_2SSO_3Na$ and $(HOC_2H_4)B2SO_2$.

When both a siloxane-polyoxyalkylene block copolymer and a creaseproofing agent are employed to treat a hydrophobic fibrous textile material in accordance with the process of this invention, a cure catalyst for the creaseproofing agent is generally employed. The choice of the catalyst is governed by the particular creaseproofing agent. By way of illustration, catalysts such as magnesium chloride, zinc chloride, zinc nitrate, and amine hydrochlorides which can be used with aminoplast resins; catalysts such as zinc fluoborate can be used with epoxides; catalysts such as hydrochloric acid can be used with aldehydes; alkaline catalyst can be used with aldehyde derivatives; and catalysts such as sodium hydrodide can be used with sulfones. The cure of the creaseproofing agent is usually effected at an elevated temperature (e.g., form 150° to 175° C.). Certain of the creaseproofing agents, particularly those aminoplast resins that contain olefinic unsaturation, can be cured by radiation.

The creaseproofing agent can be applied to the fibrous material by any of the techniques described above for application of the copolymer to the material (e.g., immersion, etc.).

The block copolymer and the creaseproofing agent can be applied to the fibrous material together (in the same treating bath) or separately (in different treating baths). When they are applied separately, they can be cured by different times or together. When they are applied together, they will generally be cured simultaneously. Preferably the block copolymer and the creaseproofing agent are applied to the fibrous material in the same treating bath and cured simultaneously.

In addition to the diluents, creaseproofing agents and catalysts mentioned above, any of a wide variety of other optional materials can be applied to the fibrous material along with the copolymers in the practice of this invention. As will be apparent to those skilled in the art, the desirability of employing such optional materials depends on the type of fibrous material and the contemplated end use of the fibrous material. Such optional materials include conventional softeners (e.g., polyethylene and silicon oils), wetting agents or emulsifying agents (e.g., alkyl polyoxyethylene alcohols), optical bleaches, coupling agents (e.g., alkenyl alkoxysilanes, mathacrylatoalkylalkoxysilanes and aminoalkylalkoxysilanes), etc.

More than one of the block copolymers, creaseproofing agents, catalysts, diluents, etc., can be employed in the process of this invention.

The siloxane-polyoxyalkylene block copolymers used in the process of this invention are superior to various other siloxane-polyoxyalkylene block copolymers in connection with the treatment of fibrous materials. Thus, the copolymers are more durable when applied to fibrous materials than prior copolymers free of reactive groups. Further, aqueous treating baths containing the copolymers used in this invention have greater storage stability than those baths containing prior copolymers having substantial amounts of SiH groups or Si–O–C linkages between the blocks. Still further, the copolymers used in this invention impart greater tear strength and sometimes better soil release to fibrous materials than otherwise similar copolymers containing ethoxysiloxy groups rather than methoxysiloxy groups. Additionally, the copolymers used in this invention impart better soil release properties to fibrous materials than prior siloxane-polyoxyalkylene block copolymers wherein the polyoxyalkylene block is composed solely or predominantly of oxypropylene groups. As compared to other soil release agents used in connection with creaseproofing agents, particularly as compared to the acrylic acid polymer soil release agents widely used commercially in conjunction with aminoplast creaseproofing agents, the block copolymers used in this invention impart improved hand to the textile materials treated therewith.

Fibrous materials treated in accordance with the process of this invention can be employed in the usual areas of use for such materials. Thus the treated fibrous materials can be converted to drapes, clothing, upholstery, etc.

The following examples illustrate the present invention.

In the following examples, the abbreviations, trademarks or tradenames indicated below are used:

| Abbreviation, Trademark or Trade name | Meaning or Description |
| --- | --- |
| Me | methyl |
| Et | ethyl |
| g. | grams |
| ml. | milliliters |
| cc. | cubic centimeter |
| liq. | liquid |
| sol. | clear solution |
| visc. | viscous |
| insol. | insoluble |
| sl. | slightly |
| v. | very |
| m. | moderately |
| Aminoplast I | This is a commercially available creaseproofing agent. It is methylolated methoxyethyl carbamate. |
| Aminoplast II | This is a commercially available creaseproofing agent composed of about 20 wt.-% of 1,3-dimethylol 4,5-dihydroxyethylene urea and about 80 wt.-% of 1,3-dimethoxymethyl 4,5-dihydroxyethylene urea. |
| Aminoplast III | This is 1,3-dimethylol-dihydroxyethylene urea which is a commercially available creaseproofing agent. |
| Fabric I | This is a commercially available fabric composed of 65 wt-% Kodel fibers (polyester fibers) and 35 wt-% cotton fibers. Fabric I has 128 warp yearns per inch and 72 filing yarns per inch. |
| Fabric II | This a commercially available fabric composed of 65 wt-% Kodel fibers and 35 wt-% cotton fibers. Fabric II has 114 warp yarns per square inch and 72 filing yarns per square inch. |
| W | When used in connection with a strength measurement, W indicates that the test stress was applied in a direction parallel to the longitudinal axis of the warp yarns. |
| F | When used in connection with a strength measurement, F indicates that the test stress was applied in a direction parallel to the longitudinal axis of the filing yarns. |
| Add on | This denotes the amount of treating agents picked up by a fabric from a treating bath on a dry (solvent-free) basis. |
| o.w.f. | This is a basis for measuring add on. The basis is weight of nonvolatile solids deposited on the fabric per unit weight of untreated fabric. |
| Fabritone PE | This is a nonionic, polyethylene emulsion having a solids content of about 30 wt.-% It is a commercially available fabric softener. |
| Mykon SF | This a commercially available fabric softener. It is a nonionic polyethylene emulsion containing about 30 wt.-% solids. |
| SR-488 | This is a commercially available soil release agent. It is an emulsion containing about 20 wt.-% of a 65 wt.-% methacrylic acid-35 wt.-% ethyl acrylate copolymer. |
| Gantrez AN-139 | This is a commercially available soil release agent. It is a maleic anhydride methyl vinyl ether copolymer. |

In the following examples, the basic creaseproofing agent baths shown below and the indicated curing conditions were used:

TABLE A

|  | Weight percent | Curing conditions | |
| --- | --- | --- | --- |
|  |  | Time (min.) | Temp. (° F.) |
| Aminoplast I bath: |  |  |  |
| Aminoplast I | 15.0 | 1.25 | 340 |
| $MgCl_2 \cdot 6H_2O$ | 3.0 |  |  |
| Water | 82.0 |  |  |
| Aminoplast II bath: |  |  |  |
| Aminoplast II | 15.0 | 3.0 | 340 |
| $MgCl_2 \cdot 6H_2O$ | 2.2 |  |  |
| Water | 82.8 |  |  |
| Aminoplast III bath: |  |  |  |
| Aminoplast III | 15.0 | 15.0 | 340 |
| Catalyst X-4 (zinc salt) | 2.6 |  |  |
| Water | 82.4 |  |  |

When other materials (e.g., the above-described siloxane-polyoxyalkylene copolymers or conventional soil release agents, softeners, etc.) were added to the above baths, the amount of water used was correspondingly decreased.

In the examples appearing below, the following procedure was used to treat fabrics with the above-described baths:

The fabric was immersed in the bath and then padded at an 80 percent wet pickup on a Butterworth Laboratory Padder, placed on pin tenter frames, dried at 300° F. for 1.5 minutes and then cured as noted in Table A above. The add on of the creaseproofing agents on the fabric so treated was 6.0 weight percent O.W.F. When SR–488 or Gantrex AN–139 were used, it was applied on a topcoating in a subsequent operation after the bath had been applied as just described. The padding, drying and curing operation used were the same as in the bath treatment.

In the examples appearing below, the tests and measurements made on treated fabrics were conducted according to the procedures indicated below:

Tear Strength
ASTM Method D–1424–59 (Elmendorf)
Tensile Strength
ASTN Method D–1682 (Grab and Ravelled Strip)
Flex Abrasion Resistance
ASTM Method D–1175–647. Samples were abraded for 10 minutes (950 cycles) and loss in tensile strength determined using ravelled strip method.
Hand
Hand of fabrics was rated subjectively.
Wash-Wear Rating (Tumble Dry)
AATCC Tentative Test Method 99A–1964T Washing Procedure III (Machine, 140° F.) Drying Procedure C (Tumble) Evaluation Procedure 1 (Low-angle)
Soil Release Rating
The soil release performance of the treated fabrics was evaluated using the Deering Millikin Stain Release Test Procedure, which consists of applying a mineral oil stain to the fabric sample, laundering the fabric and then visually rating the appearance of the stained area using photographic standards.

a. Staining
From a burette 3 inches above the surface of a glass plate four drops of Squibb mineral oil (extra heavy) were deposited and allowed to spread for 15 seconds. The fabric sample was placed over the oil drops and held in place for 30 seconds. The stained area was then covered with a piece of polyethylene and an 8 lb. weight for 30 seconds. The stained fabric was then removed from the glass plate and blotted between two paper towels under the 8-lb. weight for an additional 30 seconds. Each test sample was stained in three places.

b. Laundering
A minimum of 30 minutes after staining, ten stained fabric samples and a 4-lb. dummy load were laundered in an automatic home washer at 140° F., high water level, normal cycle with 1¼cups of "Tide." Fabrics were rinsed at 105° F. and placed in a tumble drier at high heat until thoroughly dry.

c. Rating
Fabrics were conditioned overnight at 65 percent, R.H./70° F. prior to rating. The stained samples were rated subjectively using the Deering Millikin photographic standards and overhead lighting. The white polyester/cotton fabrics were placed on a black background for rating. A rating of 5 was used to indicated complete soil removal; a rating of 1, to indicate none.

d. Durability
Samples were subjected to multiple laundering cycles consisting of washing in an automatic home washer normal cycle hot wash, warm rinse, high water level with ¼-cup Tide and tumble drying for about ten minutes until fabrics were thoroughly dry. Then steps a, b and c above were performed.

Antisoil Redeposition
Soil redeposition was evaluated by first laundering fabric samples in the presence of a mixture of synthetic oily soil dispersed in the wash water and then determining the degree of soiling by measuring fabric whitenees in the terms of green reflectance.

a. Laundering
Fabric samples were laundered in an automatic home washer, high water level (43 liters), normal cycle; 140° F. wash; 105° F. rinse. Prior to adding the samples to the washer, a mixture of 29.2 g. "Aquadag," a slurry containing 20 weight percent carbon black, (0.015 percent in bath) and 12.9 g. oleic acid (0.03 percent in bath) was dispersed in the wash water together with 1¼ cups of "Tide." The soiled fabrics were tumbled dry at high heat.

b. Reflectance
Green reflectances for the various samples were determined using a Hunter Model D–40 Reflectometer for Whiteness, and were reported as the average of warp and filling readings. Differences in green reflectance of less than 0.01 units are not readily detectable visually.

In the examples appearing below, five copolymers within scope of general formula (1) above and designated copolymers I to V were employed. Copolymers I to V can be represented more specifically by formula (A) below:

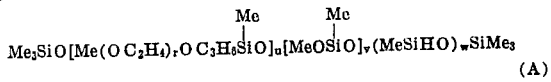

The specific composition of Copolymers I to V indicated below:

Value of Subscripts

In Formula (A)

| Copolymer | r | u | v | w | Wt.-% Siloxane |
|---|---|---|---|---|---|
| I | 7 | 8 | 32 | 0.1 | — |
| II | 15 | 8 | 32 | 0.2 | 29 |
| III | 34 | 8 | 32 | <1.0 | 25 |
| IV | 7 | 16 | 24 | 0.4 | 40 |
| V | 7 | 24 | 16 | 0.1 | 31 |

EXAMPLE I

This Example illustrates the storage stability of the block copolymers used in this invention. For purposes of comparison a block copolymer (copolymer A) containing SiH groups rather than Si-OMe groups but otherwise substantially the same as copolymer II was also tested. The appearance of the copolymers per se and 10 percent aqueous mixtures thereof was noted shortly after preparation. Then the copolymers were stored for 2 to 20 weeks and their appearance was again noted. Ten weight percent aqueous mixtures of the stored copolymers were prepared and their appearance also noted. The results are tabulated in table I below.

TABLE 1

| Copolymer | Stored (weeks) | Physical state Initial | Physical state Final | Water compatibility Initial | Water compatibility Final |
|---|---|---|---|---|---|
| I | 16 | Clear liquid | Hazy liquid | Soluble | Soluble. |
| III | 20 | Solid | Solid | do | Hazy. |
| IV | 8 | Clear liquid | Gel | do | Insoluble. |
| V | 8 | Solid | Solid | do | Do. |
| A | 2 | Clear liquid | Gel | Gel | Gel. |

EXAMPLE II

This example illustrates that the treatment of polyester-cotton fabric with aminoplast resins and the copolymers used in this invention (e.g. copolymer I) produces a fabric having durable press, soil release and good tear strength.

For purposes of comparison, a copolymer (copolymer B) containing Si-OEt groups rather than SiOMe groups but otherwise substantially the same as copolymer I was also used to treat the Fabric. Copolymer B had the average formula:

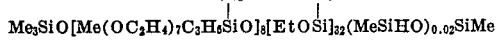

Table 2 below shows the results obtained.

TABLE 2

| Copolymer[1] | Bath | Soil release rating Initial | Soil release rating After 20 washes | Tear strength (grams) | Wash-wear rating, tumble dry |
|---|---|---|---|---|---|
| I | Aminoplast I | 4− | 4+ | 1,920/1,020 | 4 |
| B | Aminoplast I | 4 | 3 | 1,440/820 | 4 |
| I | Aminoplast II | 3+ | 4+ | 1,760/950 | 4+ |
| B | Aminoplast II | 3− | 4 | 1,520/870 | 4 |
| I | Aminoplast III | 3 | 5− | 1,800/920 | 5 |
| B | Aminoplast III | 3 | 4 | 1,480/730 | 5− |

[1] Copolymers were applied to Fabric I at 2.0 percent O.W.F.

The results shown in table 2 above illustrate that the copolymers of this invention impart improved tear strength as compared to homologous copolymers (i.e., copolymers containing siOEt groups).

EXAMPLE III

Table 3 below summarizes the influence of the polyethylene-oxide block content of copolymers of this invention on their soil release characteristics in terms of their average performance in three finish systems initially and after twenty launderings. The copolymers were applied to fabric I at 2.0 weight percent O.W.F. Copolymers containing about 70 weight percent polyoxyethylene blocks (copolymers IV and V) exhibited the best initial soil release performance and the least change in soil release properties after repeated launderings.

EXAMPLE IV

To establish the efficiency of the copolymers of this invention as soil release agents, an investigation of the performance of a representative copolymer at various levels of add-on on fabric I was conducted. The data in table 4 demonstrates that maximum and about equivalent soil release performance is obtained at copolymer add-ons of 1.0 to 4.0 percent O.W.F. On the basis of overall performance, the 4.0 percent O.W.F. level appears to be optimum.

TABLE 4

| | Percent O.W.F. Copolymer V | | | | | | |
|---|---|---|---|---|---|---|---|
| | 0 | 0.5 | 1.0 | 2.0 | 4.0 | 6.0 | 9.0 |
| Soil release initially | 3− | 4− | 4− | 4 | 4− | 3+ | 3+ |
| Anti-soil redeposition green reflectance | 0.57 | 0.66 | 0.72 | 0.72 | 0.72 | 0.70 | 0.72 |
| Wash-wear rating | 4− | 5− | 4 | 4+ | 5− | 5− | 5− |
| Tear strength, g. W/F | 820/420 | 900/460 | 920/490 | 1,090/530 | 1,350/680 | 1,410/750 | 1,590/800 |
| Hand | (1) | (2) | Soft | Soft | (3) | (3) | (4) |

[1] Slightly harsh. [2] Medium soft. [3] Very soft. [4] Slightly oily.

EXAMPLE V

The data in tables 5 and 6 below compare the soil release and overall performance characteristics of copolymers used in this invention (copolymers I, III and V) with various commercial materials used in durable press applications in conjunction with carbamates or glyoxal-based finish systems (aminoplast I and II baths) on fabrics I and II. The data in tables 5 and 6 illustrates that improved hand and comparable

TABLE 5.—AMINOPLAST II BATH[1]

| Softener and soil release agent | Percent O.W.F. | Soil release Initial | Soil release 20 washes | Anti-soil redeposition (gr. rfl.) | Wash/wear rating, tumble dry | Hand |
|---|---|---|---|---|---|---|
| None | | 3 | 3 | 0.56 | 4 | Soft. |
| Fabritone PE and SR-488 | 0.4 / 2.0 | −5 | 4 | 0.76 | 4 | Stiff. |
| Fabritone PE and Gantrez AN-139 | 0.4 / 2.0 | −3 | | | | Very stiff. |
| Copolymer I | 2.0 | 4 | 4 | 0.74 | +4 | Very soft. |
| Copolymer III | 2.0 | 4 | 4 | 0.69 | −5 | Do. |
| Untreated | | 3 | +3 | 0.75 | +2 | Soft. |

[1] Fabric II treated.

TABLE 3

| Copolymer | Wt.-percent −(C₂H₄O)ₓMe blocks | Soil release rating Initial | Soil release rating 20 washes | Anti-soil redeposition (gr. rfl.) | Wash/wear rating, tumble dry |
|---|---|---|---|---|---|
| *Aminoplast I bath* | | | | | |
| None | | 3 | 3+ | 0.56 | 4− |
| I | 45 | 4− | 4+ | 0.67 | 4 |
| IV | 60 | 3+ | 4 | 0.67 | 4+ |
| II | 69 | 4− | 3− | 0.66 | 4− |
| V | 71 | 4− | 3+ | 0.64 | 4 |
| III | 77 | 4− | 4− | 0.61 | 4+ |
| *Aminoplast II bath* | | | | | |
| None | | 3− | 3− | 0.57 | 4− |
| I | 45 | 3+ | 4+ | 0.68 | 4+ |
| IV | 60 | 4− | 4+ | 0.69 | 4− |
| II | 69 | 4 | 4 | 0.67 | 4 |
| V | 71 | 4 | 4 | 0.72 | 4 |
| III | 77 | 4 | 4− | 0.73 | 4+ |
| *Aminoplast III bath* | | | | | |
| None | | 2+ | 3 | 0.77 | 5− |
| I | 45 | 3 | 5− | 0.78 | 5 |
| IV | 60 | 4 | 4+ | 0.78 | 4+ |
| II | 69 | 4+ | 4− | 0.77 | 4+ |
| V | 71 | 4 | 4 | 0.78 | 5− |
| III | 77 | 3 | 4+ | 0.76 | 5− |
| Untreated Fabric I | | 3 | 3+ | 0.73 | 2− |

TABLE 6.—AMINOPLAST I BATH [1]

| Softener and soil release agent | Percent O.W.F. | Soil release rating Initial | Soil release rating 20 washes | Anti-soil redeposition (gr. rfl.) | Wash/wear rating, tumble dry | Hand |
|---|---|---|---|---|---|---|
| None | | 3— | 3— | 0.57 | 4— | Slightly harsh. |
| Fabritone PE and SR-488 | 0.4 / 2.0 | 5— | 4 | 0.78 | 5— | Stiff. |
| Fabritone PE and SR-488 | 0.4 / 4.0 | 5— | 4 | 0.81 | 4 | Very stiff. |
| Copolymer V | 2.0 | 4 | 4 | 0.72 | 4 | Soft. |
| Do | 4.0 | 4— | 4 | 0.72 | 5— | Very soft. |
| Untreated | | 3 | 3+ | 0.73 | 2— | Medium soft. |

[1] Fabric I treated.

properties in other areas are imparted by copolymers used in this invention as compared to mixtures of conventional softeners and soil release or antiredeposition agents.

What is claimed is:

1. A process comprising (A) applying to a fibrous material selected from the group consisting of fibrous glass materials and organic fibrous materials a minor amount of a siloxaneoxyalkylene block copolymer consisting essentially of the following groups:

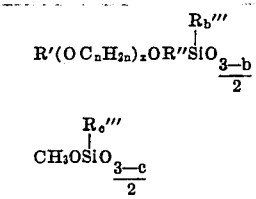

and

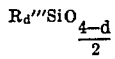

wherein R' is a hydrogen or a monovalent hydrocarbon group, R'' is an alkylene group containing at least two carbon atoms, R''' is a monovalent hydrocarbon group, $n$ has a value of at least 2, $x$ has a value of at least 5, $b$ has a value of 0, 1 or 2, $c$ has a value of 1, and $d$ has a value of 1, 2 or 3, and wherein the copolymer contains an average of at least 0.05 methoxy groups per silicon atom in the copolymer, and at least 75 mol percent of the oxyalkylene groups in the polyoxyalkylene chains are oxyethylene groups, and wherein the copolymer contains an average of less than 0.02 silicon-bonded hydrogen atoms per silicon atom; and (B) curing the copolymer on the fibrous material.

2. A process as defined in claim 1 wherein the block copolymer contains less than 0.01 silicon-bonded hydrogen atom per silicon atom.

3. A process as defined in claim 1 wherein the block copolymer contains silicon-bonded methoxy groups and silicon atoms in a ratio of from 2:10 to 8:10 inclusive.

4. A process as defined in claim 1 wherein each oxyalkylene group in each polyoxyalkylene chain is an oxyethylene group.

5. A process as defined in claim 1 wherein the block copolymer is dissolved in an aqueous solvent when applied to the fibrous material and the aqueous solvent is then volatilized.

6. A process as defined in claim 1 wherein the cured block copolymer is present on the fibrous material in an amount from about 1 to 4 weight percent based on the weight of the fibrous material.

7. A process as defined in claim 1 wherein the block copolymer is represented by the average formula:

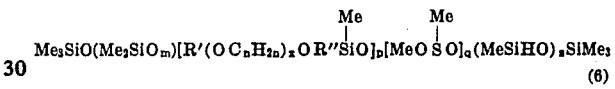

wherein Me is a methyl group, $m$ has a value from 0 to 100, $(p+q)$ has a value from 10 to 100 inclusive, $p$ is a positive number having a value from 0.15 $(p+q)$ to 0.8 to $(p+q)$, $q$ is a positive number, $z$ has a value less than 0.01 and R', $n$ has a value of at least 2 and $x$ has a value of at least 5.

8. The process of claim 1 wherein the fibrous material is an organic textile fibrous material.

9. The process of claim 1 wherein the fibrous material is fibrous glass.

10. A process as defined in claim 1 wherein the fibrous material is a fibrous textile material composed at least partly of hydrophobic fibers, wherein a minor amount of a creaseproofing agent is also applied to the fibrous material and wherein the creaseproofing agent and the copolymer are cured on the textile material.

11. The process of claim 10 wherein at least some of the hydrophobic fibers are linear polyester fibers.

12. The process of claim 10 wherein the fibrous textile material is composed of linear polyester fibers and cellulosic fibers.

13. The process of claim 10 wherein the creaseproofing agent is an aminoplast textile resin.